Jan. 4, 1944.　　　H. D. CORWIN　　　2,338,572
STEERABLE TAIL WHEEL
Filed Sept. 13, 1941　　　2 Sheets-Sheet 1

Inventor
HOWARD D. CORWIN
By Beaman + Langford
Attorneys

Jan. 4, 1944.  H. D. CORWIN  2,338,572
STEERABLE TAIL WHEEL
Filed Sept. 13, 1941  2 Sheets-Sheet 2

Inventor
HOWARD D. CORWIN

By Beaman & Langford
Attorneys

Patented Jan. 4, 1944

2,338,572

UNITED STATES PATENT OFFICE 2,338,572

STEERABLE TAIL WHEEL

Howard D. Corwin, Jackson, Mich., assignor to Lake State Products, Inc., Jackson, Mich., a corporation of Michigan Application September 13, 1941, Serial No. 410,725

10 Claims. (Cl. 244—50)

The present invention relates to improvements in caster type wheels for vehicles, and more particularly to such wheels for aircraft steerable by coordination with the rudder mechanism. The invention is particularly an improvement over the construction disclosed in the patent to Gwinn, No. 2,114,839.

In tail wheels for airplanes there have been provided structures which operate to positively steer the wheels through a limited predetermined arc, and which permit full swiveling or castering action when an attempt is made to turn the wheels past the outer limits of the predetermined arc. These structures, however, are not entirely satisfactory due to the complicated arrangement of the parts employed. The present invention simplifies the prior art constructions by reducing the number of parts required, thereby cheapening the construction, without reducing its efficiency.

An object of the invention is to provide a tail wheel assembly or the like arranged for positive steering in said predetermined arc, and for free castering when the steering mechanism is moved to turn the wheel beyond the predetermined arc.

Another object of the invention is to provide a tail wheel assembly or the like with a steering or control member releasably connected upon predetermined movement thereof, from the tail wheel.

Still another object of the invention is to provide a device of the character described having the operative parts thereof enclosed in a housing.

A still further object of the invention is to provide a device of the character described having a mounting provided with a cup-shaped member, and a control device provided with a cup-shaped member, the two cup-shaped members providing a housing, and having in the housing a latch operable by a cam track within the housing.

Figure 2:
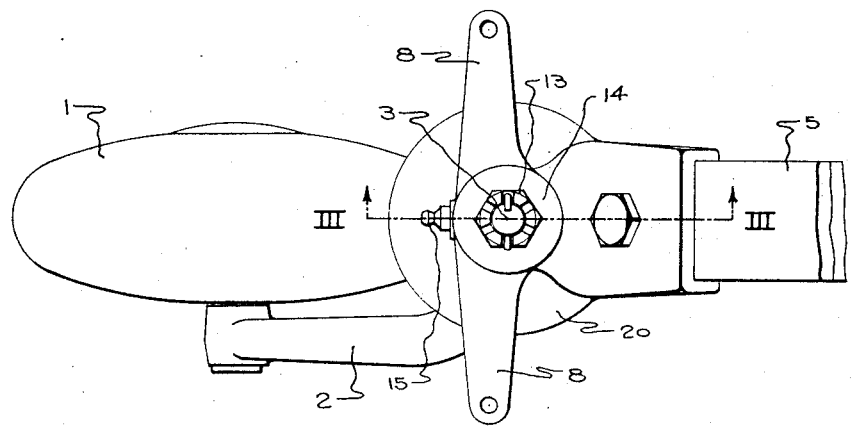
Figure 1:
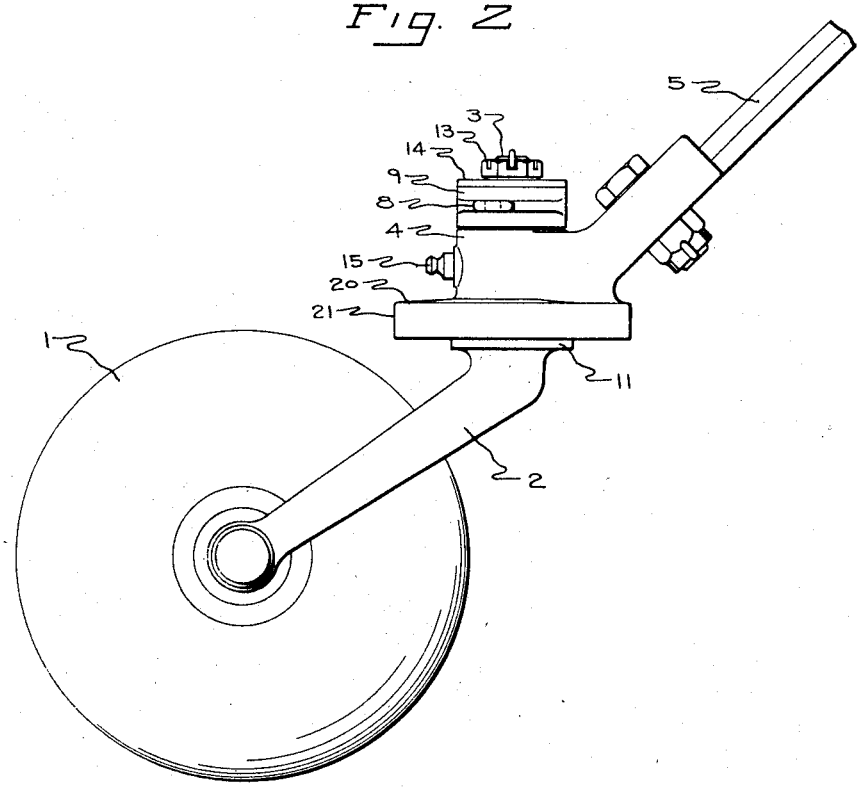
Figure 3:
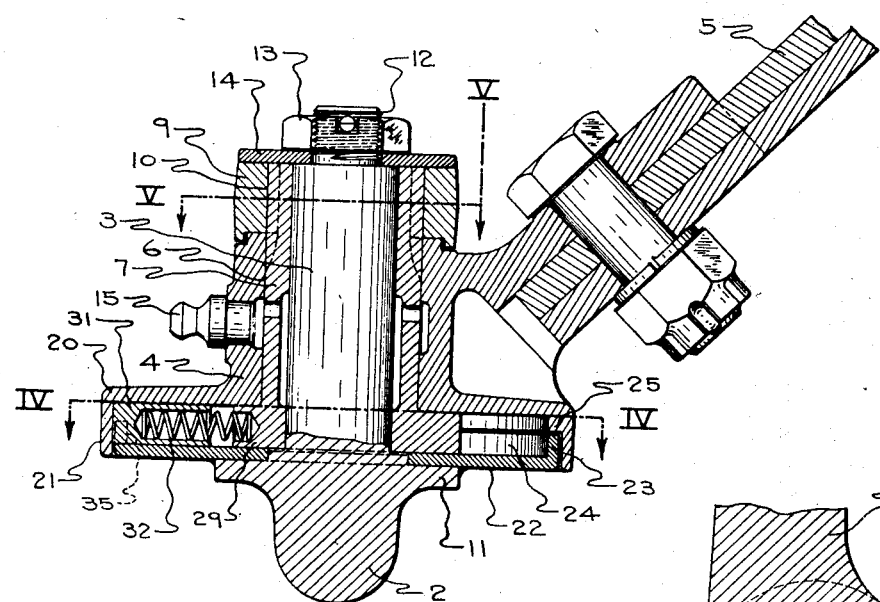
Figure 5:
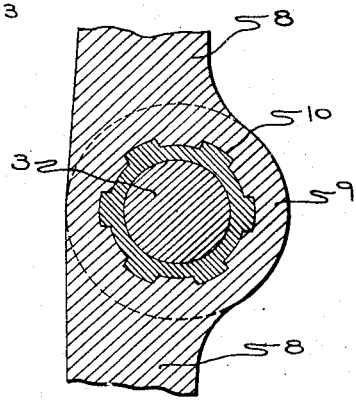
Figure 4:
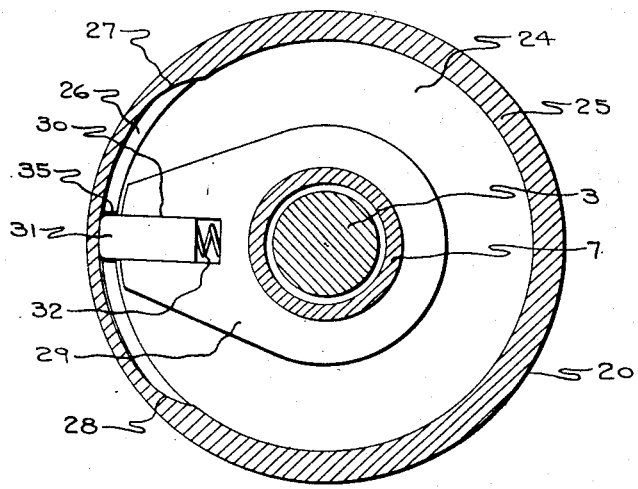

These and other objects residing in the construction, arrangement and combination of the parts will be apparent from the following specification when taken with the accompanying drawings in which Fig. 1 is a side elevation of a tail wheel assembly according to the present invention, Fig. 2 is a plan view of the construction disclosed in Fig. 1, Fig. 3 is a section on the line III—III of Fig. 2, Fig. 4 is a section on the line IV—IV of Fig. 3, and Fig. 5 is a partial section on the line V—V of Fig. 3.

Referring particularly to the drawings, the reference character 1 indicates a tail wheel mounted on an arm 2. It will be understood that the arm 2 may be replaced by forks for supporting the wheel 1 if desired. The arm 2 is supported by a tail wheel post 3 shown particularly in Fig. 3.

The tail wheel assembly is disposed in a mounting 4 which is suitably secured in a conventional manner to a bracket 5 fixed to the body of the aircraft with which the invention is associated. The mounting 4 is provided with a cylindrical bore 6 in which is journaled a control member 7. In turn, the steering wheel post 3 is journaled in the control member 7.

The control member 7 is actuated by arms 8, shown particularly in Figs. 2 and 5. The arms 8 have a hub 9 which is splined to the control member 7 by splines 10. The arms 8 are adapted to be connected by cables or their equivalents to the rudder mechanism of the aircraft to oscillate the hub 9 and through it the control member 7 to steer the aircraft. As will particularly appear from Figs. 1 and 3, the hub 9, as far as external appearance is concerned, constitutes an upward extension of the mounting 4. The upper portion of the arm 2 is provided with a shoulder 11, and the top of the post 3 is provided with a threaded portion 12. A nut 13 on the threaded portion 12 maintains the arm 2, the mounting 4, the hub 9, and the control member 7 in assembled relation. A washer 14 is provided between the nut 13 and the top of the hub 9. A grease fitting 15 is provided for lubricating the walls between the mounting 4, the control member 7, and the post 3.

The mounting 4 is provided with a downwardly facing cup-shaped member 20, having a generally cylindrical peripheral portion 21. Within the portion 21, and fixed with respect to the post 3, is an upwardly facing cup-shaped member 22, having a generally cylindrical peripheral portion 23. The portions 21 and 23 are concentric and the members 20 and 22 define a housing having an internal chamber 24. Within the chamber 24 and forming a part of the member 20 is a cam track 25. The cam track 25 is in the form of a bead around the periphery of the upper portion of the chamber 24 and is provided, as shown particularly in Fig. 4, with a cut-away portion 26 providing camming shoulders 27 and 28.

Disposed within the chamber 24 is a guiding member 29 comprising an integral part of the controlling member 7. The guiding member 29 has disposed therein a radially extending slot 30 in which is arranged a latch 31, urged outwardly by a spring 32. The peripheral portion 23 of the member 22 is provided with a recess 35 slightly larger in width than the width of the latch 31. The spring 32 normally projects the latch 31 into the recess 35, as shown particularly in Figs. 3 and 4. Thus, when the arms 8 are oscillated they act through the hub 9, the splined connection formed by the splines 10, the control member 7, the latch 31, and the member 22 to oscillate the tail wheel post 3, the arm 2, and the wheel 1 to steer the same.

As will appear particularly from Figs. 3 and 4, the latch 31 rides against the cam track 25. Within the range of the cutout portion 26, the latch 31 remains within the recess 35. However, when the latch 31 comes into engagement with either of the shoulders 27 or 28 of the cam track 25, it is cammed out of the recess 35 and is maintained by the cam track 25 out of the recess 35 to disconnect the steering arms 8 and control member 7 from the tail post 3, and thus permit free castering of the wheel 1. It will be evident that after the latch 31 has been moved from the recess 35, it may return to the recess 35 as soon as the arms 8 have been moved to bring the latch 31 opposite the cutout portion 26 and the tail wheel 1 is moved to move the recess 35 across the end of the latch 31. Thus, should the arms 8 be disposed in neutral position, that is set for straight steering of the aircraft with which the invention is associated, the latch 31 will fall into the recess 35 as soon as the tail wheel is moved to straight position, which will be with the recess 35 opposite the latch 31.

It will be evident from the foregoing description that the housing provided by the members 20 and 22 provides a covering for the operative mechanism of the invention, protecting it from water and mud, and at the same time provides a simple, efficient construction of good appearance. While the invention has been particularly described as applicable to tail wheels of aircraft, it will be evident that it may be applied to other vehicles wherein a steerable, free castering wheel is desired. Accordingly it is not intended that the claims limit the invention to any particular use.

Having thus described my invention what I desire to claim and secure by Letters Patent is:

1. A releasable wheel steering mechanism for aircraft or the like, comprising a rotatable wheel post having a wheel associated therewith, said post having a recessed portion associated therewith, a control member rotatable about the axis of said post, a latch guided by said control member, said latch being rotatable with said control member and having an operative end portion normally in interlocking relation with said recessed portion, locking said control member to said post for joint rotation therewith, and means in the path of movement of said operative end portion of said latch for camming said latch out of interlocking engagement with said recessed portion at predetermined limits of said joint rotation for discontinuing said joint rotation and permitting free castering of the wheel.

2. A releasable wheel steering mechanism for aircraft or the like, comprising a mounting adapted to be fixed relative to the aircraft, a wheel post arranged in said mounting for rotation, said post having a wheel associated therewith and having a recessed portion associated therewith, a control member rotatable about the axis of said post, a latch guided by said control member and having an operative end portion normally in interlocking relation with said recessed portion, locking said control member to said post for joint rotation therewith, and camming means carried by said mounting and disposed in the path of movement of said operative end portion of said latch for camming said latch out of interlocking engagement with said recessed portion at predetermined limits of said joint rotation for discontinuing said joint rotation and permitting free castering of the wheel.

3. A releasable wheel steering mechanism for aircraft or the like, comprising a mounting adapted to be fixed relative to the aircraft, said mounting having a portion defining a housing, said housing having a cam track therein, a wheel post arranged in said mounting for rotation, said post having a wheel associated therewith and having a recessed portion associated therewith, said recessed portion and said housing being concentric, a control member rotatable about the axis of said post, and a latch guided by said control member and having an operative end portion normally extending into said recess, locking said control member to said post for joint rotation therewith, said operative portion of said latch extending into operative engagement with said cam track, said cam track having portions for moving said latch out of said recess at predetermined limits of said joint rotation for discontinuing said joint rotation and permitting free castering of the wheel.

4. A releasable wheel steering mechanism for aircraft or the like, comprising a mounting adapted to be fixed relative to the aircraft, said mounting having a cup-shaped member facing in one direction, said member having a cam track in the periphery thereof, a wheel post arranged in said mounting for rotation, said post having a wheel associated therewith, said post having a concentric cup-shaped member facing in the other direction, said last named cup-shaped member having a recess in a periphery thereof, a control member rotatable about the axis of said wheel post, and a latch guided by said control member and having an operative end portion normally extending into said recess locking said control member to said member for joint rotation therewith, said cup-shaped members forming a housing, said latch being within said housing, and said latch having means extending into operative engagement with said cam track, said cam track having portions for moving said latch out of said recess at predetermined limits of said joint rotation for discontinuing said joint rotation and permitting free castering of the wheel.

5. A releasable wheel steering mechanism for aircraft or the like, comprising a mounting adapted to be fixed relative to the aircraft, a control member journaled in said mounting, a rotatable wheel post journaled in said control member, said post having a wheel associated therewith, said post having a recessed portion associated therewith, a latch guided by said control member, said latch being rotatable with said control member and having an operative end portion normally in interlocking relation with said recessed portion, locking said control member to said post for joint rotation therewith, and means in the path of movement of said operative end portion of said latch for camming said latch out of interlocking engagement with said recessed portion at predetermined limits of said joint rotation for discontinuing said joint rotation and permitting free castering of the wheel.

6. A releasable wheel steering mechanism for aircraft or the like, comprising a mounting adapted to be fixed relative to the aircraft, a control member journaled in said mounting, a wheel post journaled in said control member, said post having a wheel associated therewith, and having a recessed portion associated therewith, said control member and wheel post having a common axis of rotation, a latch guided by said control member and having an operative end portion normally in interlocking relation with said recessed portion, locking said control member to said post for joint rotation therewith, and camming means carried by said mounting and disposed in the path of movement of said operative end portion of said latch for camming said latch out of interlocking engagement with said recessed portion at predetermined limits of said joint rotation for discontinuing said joint rotation and permitting free castering of the wheel.

7. A releasable wheel steering mechanism for aircraft, comprising a mounting adapted to be fixed relative to the aircraft, a control member journaled in said mounting, a wheel post journaled in said control member, said post having a wheel associated therewith and having a recessed portion associated therewith, said mounting having a portion defining a housing, said housing having a cam track therein, said recessed portion and said housing being concentric, said control member and post having a common axis of rotation, and a latch guided by said control member and having an operative end portion normally extending into said recess, locking said control member to said post for joint rotation therewith, said operative portion of said latch extending into operative engagement with said cam track, said cam track having portions for moving said latch out of said recess at predetermined limits of said joint rotation for discontinuing said joint rotation and permitting free castering of the wheel.

8. A releasable wheel steering mechanism for aircraft or the like, comprising a mounting adapted to be fixed relative to the aircraft, a control member journaled in said mounting, a wheel post journaled in said control member, said post having a wheel associated therewith, and having a concentric cup-shaped member facing in one direction, said cup-shaped member having a recess in the periphery thereof, said mounting having a cup-shaped member facing in the other direction, said last named cup-shaped member having a cam track in the periphery thereof, said control member and said post having a common axis of rotation, said cup-shaped members forming a housing, and a latch guided by said control member and having an operative end portion normally extending into said recess, locking said control member to said post for joint rotation therewith, said latch being disposed in said housing and said latch having means extending into operative engagement with said cam track, said cam track having portions for moving said latch out of said recess at predetermined limits of said joint rotation for discontinuing said joint rotation and permitting free castering of the wheel.

9. A releasable wheel steering mechanism for aircraft or the like, comprising a mounting adapted to be fixed relative to the aircraft, a control member journaled in said mounting, a wheel post journaled in said control member, a releasable connection means, between said post and said control member, means for actuating said control member, and a keyed connection between said actuating means and said control member for locking the same together for joint rotation.

10. A releasable wheel steering mechanism for aircraft or the like, comprising a mounting adapted to be fixed relative to the aircraft, a generally cylindrical control member journaled in said mounting and concentric therewith, a wheel post journaled in said control member and concentric with said control member, a releasable connection means between said post and said control member, and means for actuating said control member.

HOWARD D. CORWIN.